C. J. DORRANCE.
FLEXIBLE TROLLEY HARP.
APPLICATION FILED OCT. 17, 1921.
1,424,717.
Patented Aug. 1, 1922.
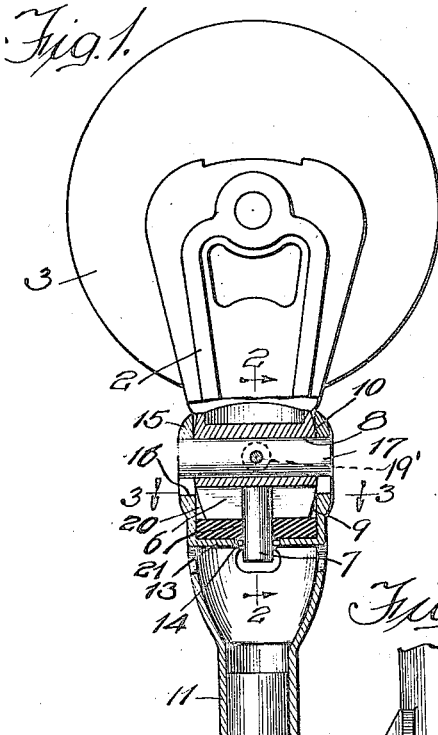
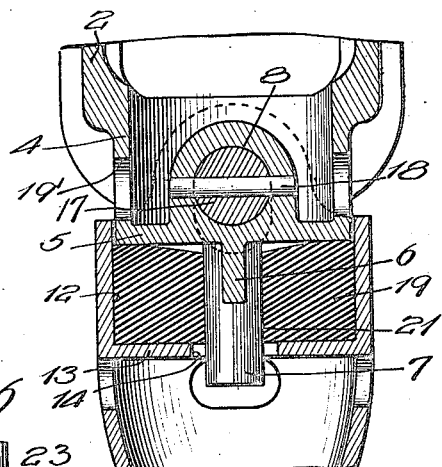
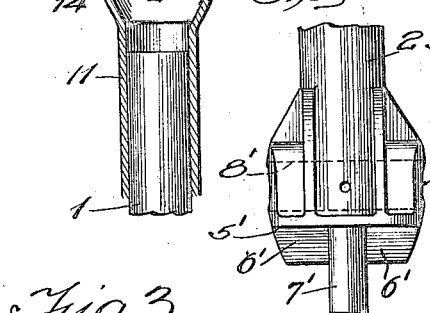
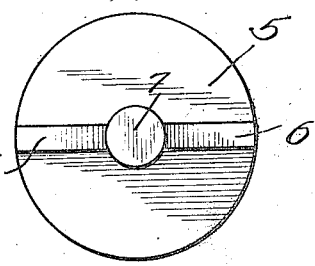
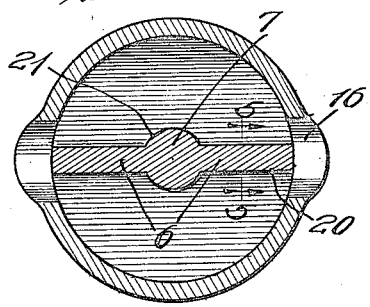
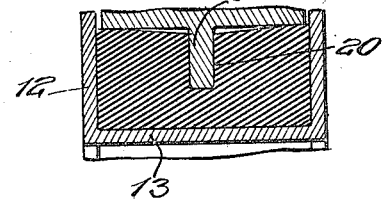
Witnesses:
W. F. Kilroy
Ruth M. Ephraim
Inventor:
Charles J. Dorrance
By Hill & Hill Attys.

UNITED STATES PATENT OFFICE.

CHARLES J. DORRANCE, OF CHICAGO, ILLINOIS.

FLEXIBLE TROLLEY HARP.

1,424,717.　　　　　Specification of Letters Patent.　　Patented Aug. 1, 1922.

Application filed October 17, 1921. Serial No. 508,287.

*To all whom it may concern:*

Be it known that I, CHARLES J. DORRANCE, a citizen of the United States, residing at Chicago, in the county of Cook and State of Illinois, have invented certain new and useful Improvements in a Flexible Trolley Harp, of which the following is a description.

This invention belongs to that general class of devices known as trolley poles, and relates particularly to a shock absorbing device applicable for use on the pole for carrying the trolley wheel or other trolley contact device or equivalent of the harp and wheel.

The invention has among its objects the production of a device of the kind described that is simple, convenient, durable, reliable, compact, efficient and satisfactory for use wherever found applicable. It has particularly as an object the production of a device for holding the trolley wheel on the wire at all times and preventing the wheel or contact device from jumping the trolley wire.

The invention has particularly among its objects the production of a trolley pole device of the kind described that will prove economical and desirable for the user, by reducing the ordinary repairs heretofore constantly necessary on the overhead wires and supports therefor, lessening noise, reducing wear on the wheel and overhead conductor, and preventing trolley wire damage by derailment.

Many other objects and advantages of the construction herein shown and described will be obvious to those skilled in the art from a disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a sectional view, partly in elevation, of a trolley pole and harp embodying my invention;

Fig. 2 is an enlarged sectional view taken substantially on the line 2—2 of Fig. 1;

Fig. 3 is an enlarged sectional view taken substantially on the line 3—3 of Fig. 1;

Fig. 4 is a bottom end view of the trolley wire contact device;

Fig. 5 is a sectional view taken substantially on the line 5—5 of Fig. 3; and

Fig. 6 is a fragmentary elevation of an adapter whereby other types of trolley harps may be used with my device.

Referring to the drawings, it may be mentioned that my device is intended to be ordinarily located at the upper or free end of the trolley pole for carrying the trolley wheel, or such other trolley wire contact device as may be desired, the same being substantially a real universal joint as well as a substantially perfect shock absorber. The upper end of the trolley pole is indicated by the reference numeral 1. 2 indicates a harp, as is commonly known, and 3 the trolley wheel or other contacting device, my invention consisting of suitable means or mechanism for securing the trolley harp and wheel at the end of the pole and carrying the same thereat.

In my improved construction, the trolley harp 2 has a base 4 preferably substantially circular and has an imperforate web 5 extending transversely across its lower end. A pair of wings 6 are arranged radially at the under side of the web 5 so as to project therebeyond, said wings lying in a diametral line. Midway of the wings 6 and projecting axially beyond the web 5 there is arranged a pin 7. Immediately above the web 5, the member 2 is transversely bored, as at 8, the axis of said bore lying in the diametral plane of the wings 6. The free ends of wings 6 are preferably tapered as at 9, and the member 2 is spherically rounded at the ends of the bore 8, as at 10, so as to provide a spherical bearing for a purpose to be more clearly hereinafter described.

I also provide a suitable part 11 formed with a hollow sleeve portion to receive the end of the trolley pole 1, which may be secured thereto in any suitable manner and also preferably formed with a recess or socket 12 at its upper or head end, as shown. The member 11 is provided with a web 13 extending transversely across its upper end inwardly of the free end of the socket, said web being provided with an axial bore 14. Projecting forwardly of the socket at diametrically opposite sides thereof is a pair of ears 15, each having a longitudinally extending elongated slot 16 therethrough, said slots being in diametral alignment.

The lower end of the part 2 is adapted to be arranged within the socket portion of the part 11 and a pivot pin 17 is adapted to be positioned through the aligned openings 8 and 16 of the cooperating members so as to permit a slight pivotal movement therebetween about the axis of the pin. There is also permitted a slight pivotal movement between said members about an axis perpendicular to the axis of the pivot pin, this last-mentioned pivotal movement being limited in extent, and due to the curvature or spherical rounding of the lower end of the member 2 fitting within the socket 12, so that when the member 2 is pivoted in a vertical plane coincident with the axis of the pivot pin 17, the pivot pin moves with the member 2 and slides in the elongated slots 16. In order to secure the pivot pin 17 in place, a cotter, locking pin, or any other suitable or equivalent means for the purpose, may be inserted radially through the pivot pin, as at 18, (see Fig. 2), said cotter pin 18 being detachably removable by the use of any suitable tool. Openings 19 are arranged in alignment with the cotter pin 18 for the purpose of permitting the insertion of a tool or the like for manipulating the cotter 18.

Adapted to seat in the socket 12 on the web 13 is an elastic, resilient cushion member 19, said cushion member extending to within a short distance of the free end of the socket and having a diametral slot or groove 20 thereacross, and an axial bore 21 therethrough centrally of the slot 20, the slot 20 being arranged to snugly receive the wings 6 and the bore 21 constructed to snugly receive the pin 7 of the member 2, said pin projecting into the socket 12 a slight distance beyond the web 13. It will be noted that the opening 14 is of a greater diameter than that of the pin 7 so as to allow lateral movement of the pin 7 in the opening.

With the parts arranged in the manner shown in the drawings it will be seen that while relative twisting or rotation of the parts is prevented, there is permitted a transverse pivotal movement of the members 11 and 2 relative to each other in mutually transverse planes, but that this pivotal movement is yieldingly resisted by the elastic cushion member 19, said cushion tending to return the parts 11 and 2 to their initial position after the bending force thereon ceases. The cushion 19, which may be of rubber or any equivalent material, also serves as a shock obsorber to prevent excessive vibration between the members, and also aids in gripping and holding the members together.

In case it is desired to use my device without discarding the trolley harp already in use, I have provided an adapter member having an elongated portion 23 which may be connected to the usual type of trolley harp in any desired manner. The base of said adapter is constructed similarly to the base of the harp 2 previously described, said base portion having a web 5' transversely across its lower end, a pair of aligned radial wings 6' projecting beyond said web and a pin 7' centrally of said wings and projecting therebeyond. A transverse bore 8' is arranged above the web to receive the pivotal locking pin 17 and the surface of the lower portion of said adapter member is spherically rounded as at 10' at the opposite ends of the bore 8' in a manner similar to the spherical rounding 10 of the harp member 2. The adapter member is positioned within the socket of the member 11 in the same manner as was the base of the harp just described, and it has the same pivotal movement therein in mutually transverse planes, said pivotal movement being yieldingly resisted by the cushion member 19.

In operation, the mechanism forms a flexible connection between the pole and harp in such a manner that the trolley harp or other electrical contact device at the extreme end of the pole may be swung in mutually transverse planes, the flexible connection serving to uphold the upper end or trolley wheel of the trolley pole so that the contact between the wheel and trolley wire is sufficient to prevent arcing at the point of contact between the wheel and wire. Twisting of the parts or relative rotation, however, is prevented. The parts may be easily removed from the pole when necessary to replace the same for any reason whatsoever.

In the specification and claims, I have specified the device as a trolley harp carrier, and refer to the trolley wheel and trolley harp, but inasmuch as it is obvious that the device would operate the same or substantially so for any equivalent of the trolley wheel or harp, I wish to be understood that in specifying a trolley harp and trolley wheel and similar terms as including any type of contact device arranged to roll, slide or otherwise cooperate with the trolley wire, and take current therefrom or thereto.

It is to be understood that the elongated slot and pin connection between the members 2 and 11 may be as shown, or that the member 2 may be provided with the elongated slot 16, in which case the member 11 would be provided with a transverse bore through which the pin 17 would be inserted, the action being the same in either case.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a member arranged to be secured to a trolley pole and provided with a socket at one end, a web transversely of said socket inwardly of the end thereof, a second member arranged for attachment to a trolley wire contact device and provided with a web transversely across the lower end thereof, a pin projecting axially of said last-mentioned web, cushion means adapted to be seated between the webs of both said members and to receive said projecting pin, and means for securing said members together to permit a limited play therebetween in mutually transverse planes.

2. In a device of the kind described and in combination, a member arranged to be secured to a trolley pole and provided with a socket at one end, a web transversely of said socket inwardly of the end thereof, a second member arranged for attachment to a trolley wire contact device and provided with a web transversely across the lower end thereof, a pin projecting axially of said last-mentioned web, a diametral wing projecting longitudinally of said last-mentioned web, cushion means adapted to be seated between the webs of both of said members and to receive said projecting pin and wings of the second-named member, and means for securing said members together to permit a limited play therebetween in mutually transverse planes.

3. In a device of the kind described and in combination, a member arranged to be secured to a trolley pole and provided with a socket at one end, a web transversely of said socket inwardly of the end thereof, a second member arranged for attachment to a trolley wire contact device and provided with a web transversely across the lower end thereof, a pin projecting axially of and a diametral wing projecting longitudinally of said last-mentioned web, cushion means adapted to be firmly seated in said socket between the webs of both said members and to snugly receive said projecting pin and wings of the second-named member to yieldably resist movement therebetween, and means for securing said members together to permit a limited play therebetween in mutually transverse planes.

4. In a device of the kind described and in combination, a member arranged to be secured to a trolley pole and provided with a socket at one end, an axially bored web transversely of said socket inwardly of said end, a second member arranged for attachment to a trolley wire contact device, provided with a web extending transversely across the lower end thereof, a pin projecting axially of said web and a diametral wing projecting longitudinally of said web, cushion means adapted to be seated in said socket on said first-mentioned web, split diametrically and provided with an axial bore to receive said projecting pin and wing of the second-named member and yieldably resist movement between said members, and means for pivotally securing said members together to permit a limited play therebetween in mutually transverse planes.

5. In a device of the kind described and in combination, a member arranged to be secured to a trolley pole, provided with a socket at one end, an integral web transversely of said socket inwardly of said end and provided with an axial bore therethrough, said member being also provided with a pair of oppositely facing ears each having a longitudinally extending elongated slot therethrough, a second member arranged for attachment to a trolley wire contact device and provided with an imperforate integral web transversely across the lower end thereof, there being a transverse bore above said web, a pin projecting axially of and a diametral wing projecting longitudinally of said last-mentioned web, a cushion member adapted to be seated in said socket on the web of the first-mentioned member, provided with a diametral slot to receive said wing and with an axial bore to receive said pin, so that lateral movement between said members is yieldably resisted, the lower end of said first-mentioned member being adapted to seat in said socket with its transverse bore in registry with said elongated slots in the ears, and a pin adapted to be inserted through said registering transverse bore and slots to pivotally interconnect said members and permit a limited play therebetween in mutually transverse planes.

6. In a device of the kind described and in combination, a member arranged to be secured to a trolley pole and having a socket at one end with an axially bored web thereacross, a second member arranged for attachment to a trolley wire contact device, the lower part thereof constructed with a web thereacross and bored transversely above said web, a pin projecting axially of said last-mentioned web, aligned radial wings also projecting from said web, said last-mentioned member being so constructed as to have its lower end fit within said socket with a slight pivotal play in both directions therebetween, a pivot pin through said second member and the transverse bore of said first member, the second member having elongated slots to slidably receive said pivot pin, and a cushion between said members and recessed to snugly receive said wings, and an axial pin to yieldingly resist said relative pivotal movement.

7. In a device of the kind described and in combination, a member adapted for attachment to a trolley pole and having a socket at one end thereof with an axially bored integral web extending transversely thereof, a pair of ears arranged diametrically of said socket and projecting longitudinally therebeyond and having an elongated, longitudinally extending slot in each of said ears, a second member arranged for attachment to a trolley wire contact device and provided with an integral imperforate web extending entirely across the bottom thereof, a pair of projecting wings transversely of said web diametrically thereof, and a pin centrally of said wings and projecting axially of said web, said second-mentioned member being also provided with a diametral bore immediately above said web and extending in the same plane as said wings, the lower portion of said member and said wings being tapered to fit within the socket of said first-mentioned member so as to permit a pivotal movement therebetween in a pair of mutually transverse planes, a pin adapted to extend through said registering transverse bore and slotted ears to pivotally secure said members together, and a resilient cushion adapted to seat in said socket between said members and provided with a diametral slot to snugly receive said wings and with an axial bore in registry with the axial bore of the web of said first-mentioned member to receive the axial pin projecting beyond the web of said second-mentioned member to yieldably permit said slight pivotal movement between said members.

8. A trolley harp comprising a lower end having a transverse web entirely thereacross, a pair of radial wings diametrically across and projecting beyond said web, a pin centrally of said wings and projecting beyond said web, and also provided with a transverse bore above said web, having its axis in the plane of said wings, said harp having its lower end spherically rounded at the ends of said transverse bore so as to be adapted to seat in a cooperating member and permit a universal movement therebetween.

9. In a device of the kind described and in combination, a member arranged to be secured to a trolley pole and provided with a socket at one end, a web transversely of said socket inwardly of said end thereof, a second member arranged for attachment to a trolley wire contact device provided with a web extending transversely across the lower end thereof, a diametral wing projecting longitudinally of said web, cushion means adapted to be seated in said socket on said first-mentioned web and split diametrically across to receive said wing of the second-named member and yieldably resist movement between said members, and means for pivotally securing said members together to permit a limited play therebetween in mutually transverse planes.

10. In a device of the kind described and in combination, a member arranged to be secured to a trolley pole provided with a socket at one end, an integral web transversely of said socket inwardly of said end, a second member arranged for attachment to a trolley wire contact device and provided with an integral web transversely extending entirely across the lower end thereof, a diametral wing carried by and projecting longitudinally of said last-mentioned web, a cushion member adapted to be seated in said socket on the web of the first-mentioned member, provided with a diametral slot to receive said wing to yieldably resist lateral movement between said members, one of said members being provided with a pair of longitudinally extending elongated slots therethrough, the other of said members having a transverse bore therethrough, the lower end of said first-mentioned member being adapted to seat in said socket, so that the transverse bore will be in registry with said elongated slots, and a pin adapted to be inserted through said registering transverse bore, and slots to pivotally interconnect said members and permit a limited play therebetween in mutually transverse planes.

11. In a device of the kind described and in combination, a member arranged to be secured to a trolley pole and having a socket at one end with a web thereacross, a second member arranged for attachment to a trolley wire contact device, the lower part thereof constructed with a web thereacross, said last-mentioned member being so constructed as to have its lower end fit within said socket with a slight pivotal play in both directions therebetween, one of said members having a transverse bore therethrough, the second member having aligned elongated slots adapted to register with said transverse bore, a cushion between said members, and a pivot pin through said registering transverse bores.

12. In a device of the kind described and in combination, a member arranged to be secured to a trolley pole and provided with a socket at one end, a web transversely of said socket inwardly of the end thereof, a second member arranged for attachment to a trolley wire contact device and provided with a web transversely across the lower end thereof, means for securing said members together to permit a limited pivotal play therebetween in mutually transverse planes, and cushion means adapted to be seated between the webs of both of said means to yieldably resist said play.

13. In a device of the kind described and in combination, a member arranged to be secured to a trolley pole and provided with a socket at one end, a web transversely of said socket inwardly of the end thereof, a second member arranged for attachment to a trolley wire contact device and provided with a web transversely across the lower end thereof, a lug projecting downwardly of said last-mentioned web, means for securing said members together to permit a limited pivotal play therebetween in mutually transverse planes, and cushion means adapted to be seated between the webs of both of said means and to receive said projecting lug to yieldably resist said play.

In testimony whereof, I have hereunto signed my name in the presence of two subscribing witnesses.

CHARLES J. DORRANCE.

Witnesses:
 ROY W. HILL,
 RUTH M. EPHRAIM.